US010797588B2

(12) United States Patent
Yasuda

(10) Patent No.: US 10,797,588 B2
(45) Date of Patent: Oct. 6, 2020

(54) CONVERTER CONTROL SYSTEM

(71) Applicant: Toyota Jidosha Kabushiki Kaisha, Toyota-shi, Aichi-ken (JP)

(72) Inventor: Toshihiro Yasuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 188 days.

(21) Appl. No.: 16/142,827

(22) Filed: Sep. 26, 2018

(65) Prior Publication Data

US 2019/0181747 A1   Jun. 13, 2019

(30) Foreign Application Priority Data

Dec. 11, 2017 (JP) ................................. 2017-236717

(51) Int. Cl.
*H02M 1/36* (2007.01)
*H02M 1/08* (2006.01)
*H02M 3/158* (2006.01)
*H02P 27/08* (2006.01)
*H02M 1/32* (2007.01)

(52) U.S. Cl.
CPC ............ *H02M 1/36* (2013.01); *H02M 1/08* (2013.01); *H02M 3/1584* (2013.01); *H02M 2001/325* (2013.01); *H02M 2003/1586* (2013.01); *H02P 27/08* (2013.01)

(58) Field of Classification Search
CPC ........ H02M 1/36; H02M 1/08; H02M 3/1584; H02M 2001/325; H02M 2003/1586; H02P 27/08
See application file for complete search history.

(56) References Cited

U.S. PATENT DOCUMENTS 7,609,040 B1 * 10/2009 Jain ...................... H02M 3/1584
                                                      323/276
9,331,594 B2 * 5/2016 Gu ......................... H02M 5/458
(Continued)

FOREIGN PATENT DOCUMENTS

CN    103518347 A    1/2014
CN    105515371 A    4/2016
(Continued)

*Primary Examiner* — Adolf D Berhane
*Assistant Examiner* — Kevin H Sprenger
(74) *Attorney, Agent, or Firm* — Dinsmore & Shohl LLP

(57) ABSTRACT

A converter control system includes first and second step-up converters and first and second electronic control units. The first and second electronic control units are respectively configured to generate first and second PWM driving signals for the first and second step-up converters. The second electronic control unit is configured to determine whether a first carrier and a second carrier are synchronous with each other based on the first PWM driving signal, a first duty ratio, and the second carrier. The second electronic control unit is configured to, when the second electronic control unit determines that the first carrier and the second carrier are not synchronous with each other, shut down the second step-up converter and then restart generation of the second PWM driving signal with the second carrier synchronous with the first carrier with the use of the first PWM driving signal and the first duty ratio.

7 Claims, 7 Drawing Sheets

(56) References Cited

U.S. PATENT DOCUMENTS

| | | | |
|---|---|---|---|
| 2011/0013440 A1* | 1/2011 | Mechi | H02M 1/4216 |
| | | | 363/152 |
| 2012/0229061 A1 | 9/2012 | Itoh et al. | |
| 2014/0376268 A1* | 12/2014 | Manthe | B23K 9/093 |
| | | | 363/17 |
| 2016/0101702 A1 | 4/2016 | Oi et al. | |
| 2016/0125791 A1* | 5/2016 | Park | G09G 3/3208 |
| | | | 345/211 |
| 2018/0233078 A1* | 8/2018 | Park | H02M 1/36 |
| 2018/0269790 A1* | 9/2018 | Uno | H02M 3/156 |
| 2018/0367062 A1* | 12/2018 | Schneggenburger | |
| | | | H02M 7/5387 |

FOREIGN PATENT DOCUMENTS

| | | |
|---|---|---|
| JP | 2012-210138 A | 10/2012 |
| JP | 2016-082622 A | 5/2016 |

\* cited by examiner

CONVERTER CONTROL SYSTEM

CROSS-REFERENCE TO RELATED APPLICATIONS

This application claims priority to Japanese Patent Application No. 2017-236717 filed on Dec. 11, 2017, which is incorporated herein by reference in its entirety including the specification, drawings and abstract.

BACKGROUND

1. Technical Field

The disclosure relates to a converter control system and, more particularly, to a converter control system including a first step-up converter and a second step-up converter.

2. Description of Related Art

Conventionally, a system including two step-up converters has been suggested as a converter control system of this type (see, for example, Japanese Unexamined Patent Application Publication No. 2012-210138 (JP 2012-210138 A)). The two step-up converters are connected in parallel with each other. The two step-up converters step up electric power from a battery and supply the electric power to an inverter. The inverter drives a drive motor. This system includes two driving circuits and a command device. The two driving circuits individually drive the two step-up converters, respectively. The command device outputs PWM signals to the two driving circuits. The system is able to independently drive the two step-up converters.

SUMMARY

In some converter control systems each including two step-up converters, two different electronic control units respectively generate two PWM driving signals for driving the two step-up converters. In this case, the two electronic control units respectively generate two carriers asynchronous in phase with the same frequency are based on a carrier command, and generate two PWM driving signals by applying duty ratios of the step-up converters to the two carriers. The two electronic control units are connected to each other by a synchronization line, so synchronization of the two carriers asynchronous in phase is ensured even when the carrier frequency is changed in response to the carrier command. In the thus configured system, when the synchronization line has an abnormality, such as a break, if the carrier frequency is changed in response to a carrier command, it may be not possible to ensure synchronization of the two carriers asynchronous in phase due to different timing of changing the carrier frequency between the two electronic control units. This may lead to a hardware failure.

The present disclosure provides a converter control system that synchronizes a second carrier with a first carrier when the first and second carriers asynchronous in phase are not synchronous with each other.

The converter control system of the disclosure employs the following manner to achieve the above-described main object.

An aspect of the disclosure provides a converter control system. The converter control system includes a first step-up converter, a second step-up converter, a first electronic control unit, and a second electronic control unit. The first step-up converter is configured to be driven in accordance with a first PWM driving signal. The second step-up converter is configured to be driven in accordance with a second PWM driving signal. The first electronic control unit is configured to generate the first PWM driving signal based on a first duty ratio and a first carrier based on a carrier command. The second electronic control unit is configured to generate the second PWM driving signal based on a second duty ratio and a second carrier based on the carrier command. The second carrier is asynchronous in phase with the first carrier. The second electronic control unit includes a monitoring correction device. The monitoring correction device is configured to execute a synchronization monitoring process. The synchronization monitoring process is a process of determining whether the first carrier and the second carrier are synchronous with each other based on the first PWM driving signal, the first duty ratio, and the second carrier. The monitoring correction device is configured to, when the monitoring correction device determines that the first carrier and the second carrier are not synchronous with each other, execute a shutdown process and a first restart process. The shutdown process is a process of shutting down the second step-up converter. The first restart process is a process of restarting generation of the second PWM driving signal with the second carrier synchronous with the first carrier with the use of the first PWM driving signal and the first duty ratio.

In this converter control system, the first electronic control unit generates a first PWM driving signal based on a first duty ratio and a first carrier based on a carrier command, and drives the first step-up converter with the first PWM driving signal. The second electronic control unit generates a second PWM driving signal based on a second duty ratio and a second carrier based on the carrier command, and drives the second step-up converter with the second PWM driving signal. At this time, the second carrier is asynchronous in phase with the first carrier. The monitoring correction device of the second electronic control unit determines whether the first carrier and the second carrier are synchronous with each other based on the first PWM driving signal, the first duty ratio, and the second carrier. When the monitoring correction device determines that the first carrier and the second carrier are not synchronous with each other, the monitoring correction device initially shuts down the second step-up converter. Then, the monitoring correction device restarts generation of the second PWM driving signal with the second carrier synchronous with the first carrier with the use of the first PWM driving signal and the first duty ratio. Thus, when the first carrier and the second carrier that are asynchronous in phase are not synchronous with each other, it is possible to synchronize the second carrier with the first carrier. As a result, it is possible to reduce inconvenience (such as hardware failure) that occurs due to the fact that the first carrier and the second carrier that are asynchronous in phase are not synchronous with each other.

The first electronic control unit may include a first carrier generating device, a first duty computing device, and a first PWM driving signal generating device. The first carrier generating device may be configured to generate the first carrier based on the carrier command. The first duty computing device may be configured to compute the first duty ratio. The first PWM driving signal generating device may be configured to generate the first PWM driving signal based on the first carrier and the first duty ratio. The second electronic control unit may include a second carrier generating device, a second duty computing device, and a second PWM driving signal generating device. The second carrier generating device may be configured to generate the second carrier based on the carrier command. The second duty computing device may be configured to compute the second duty ratio. The second PWM driving signal generating device may be configured to generate the second PWM driving signal based on the second carrier and the second duty ratio. The converter control system may further include a synchronization line. The synchronization line may connect the first carrier generating device and the second carrier generating device to each other. The synchronization line may be configured to exchange a synchronization signal for synchronizing the second carrier with the first carrier. The monitoring correction device may be configured to determine whether there is an abnormality in synchronization through the synchronization line. The monitoring correction device may be configured to, when the monitoring correction device determines that there is an abnormality in synchronization through the synchronization line, execute the synchronization monitoring process, the shutdown process, and the first restart process.

With the above configuration, even when there is an abnormality in synchronization through the synchronization line, it is possible to synchronize the first and second carriers asynchronous in phase with each other. Therefore, it is possible to reduce inconvenience (such as hardware failure) that occurs due to the fact that the first carrier and the second carrier that are asynchronous in phase are not synchronous with each other.

In the converter control system, the monitoring correction device may have a calculation process and a determination process as the synchronization monitoring process. The calculation process may be a process of calculating first timing of the first carrier based on time of a leading edge of the first PWM driving signal, a duration from the leading edge to a trailing edge of the first PWM driving signal, and the first duty ratio. The determination process may be a process of, when a difference between the first timing and second timing of the second carrier is shorter than a threshold, determining that the first carrier and the second carrier are synchronous with each other.

With the above configuration, it is possible to further properly determine whether the first carrier and the second carrier that are asynchronous in phase are synchronous with each other. In this case, the first timing may be one of timing at a valley of the first carrier and timing at a peak of the first carrier. The second timing may be timing at a peak of the second carrier when the first timing is the timing at a valley of the first carrier, and may be timing at a valley of the second carrier when the first timing is the timing at a peak of the first carrier. In this case, the first carrier and the second carrier are different in phase by n.

In the converter control system, the monitoring correction device may have a first estimation process and a second restart process as the first restart process. The first estimation process may be a process of estimating third timing of the first carrier based on the first PWM driving signal and the first duty ratio. The second restart process may be a process of restarting the second carrier generating device such that the third timing of the first carrier coincides with fourth timing of the second carrier at a frequency based on the carrier command. In this case, the monitoring correction device may have a second estimation process and a third restart process as the first restart process. The second estimation process may include the following processes i) and ii): i) a process of estimating the third timing of the first carrier based on time of a leading edge of the first PWM driving signal, a duration from the leading edge to a trailing edge of the first PWM driving signal, and the first duty ratio; and ii) a process of estimating a waiting time until the third timing. The third restart process may be a process of restarting the second carrier generating device such that the fourth timing of the second carrier comes at the time when the waiting time until the third timing has elapsed.

With this configuration, it is possible to synchronize the second carrier with the first carrier. At this time, the third timing may be one of timing at a valley of the first carrier and timing at a peak of the first carrier. The fourth timing may be timing at a peak of the second carrier when the third timing is timing at a valley of the first carrier, and may be timing at a valley of the second carrier when the third timing is timing at a peak of the first carrier. In this case, the first carrier and the second carrier are different in phase by $\pi$.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described.

Figure 1:
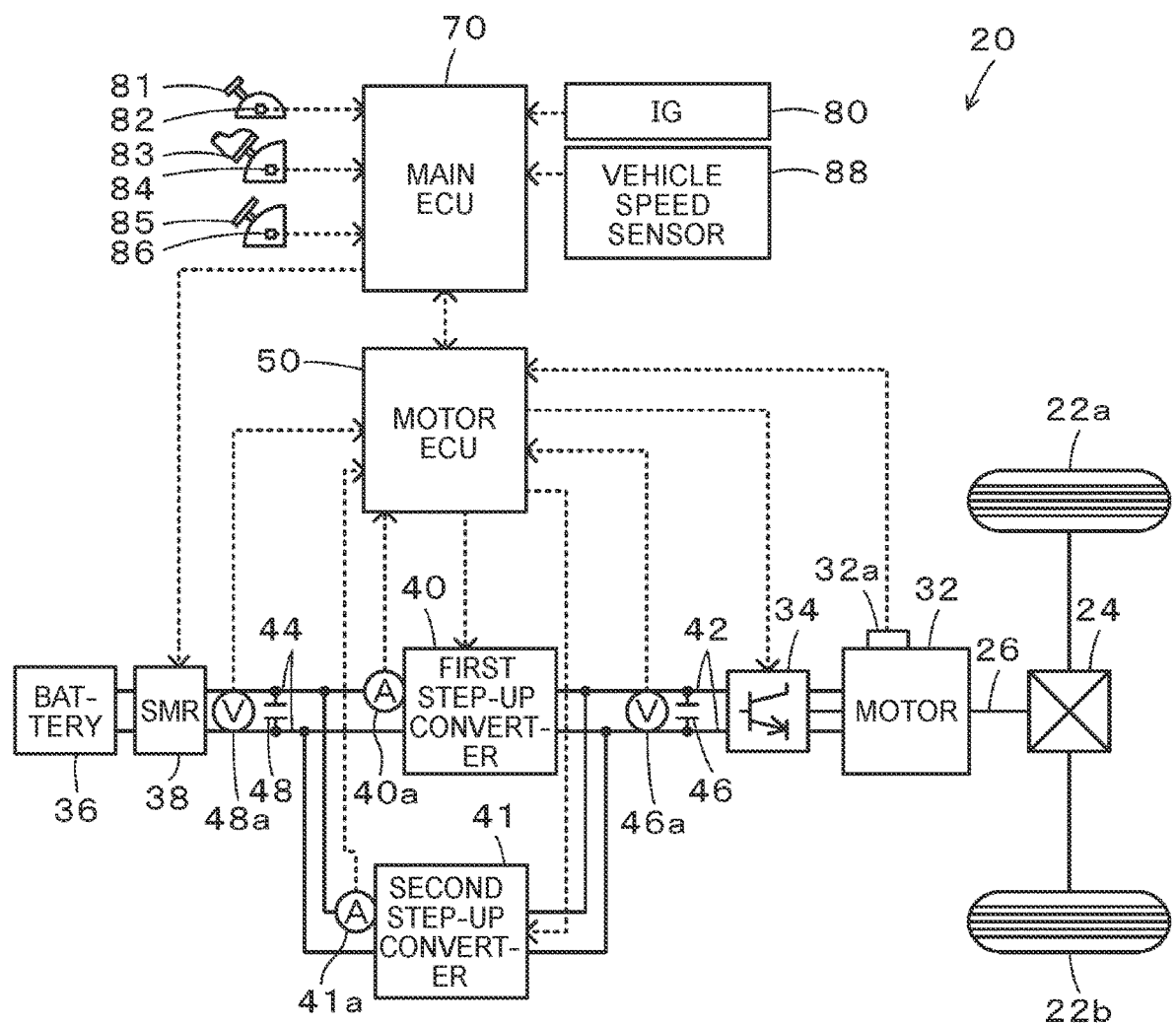
FIG. 1 is a diagram that schematically shows the configuration of an electric vehicle on which a converter control system according to an embodiment of the disclosure is mounted.

FIG. 1 is a diagram that schematically shows the configuration of an electric vehicle 20 on which a converter control system of the embodiment of the disclosure is mounted. As shown in FIG. 1, the electric vehicle 20 of the embodiment includes a motor 32, an inverter 34, a battery 36, first and second step-up converters 40, 41, a motor electronic control unit (hereinafter, referred to as motor ECU) 50, and a main electronic control unit (hereinafter, referred to as main ECU) 70. The battery 36 serves as an electrical storage device. The first and second step-up converters 40, 41, and the motor ECU 50 correspond to the converter control system of the embodiment.

The motor 32 is configured as, for example, a synchronous generator-motor. A rotor of the motor 32 is connected to a drive shaft 26 coupled to drive wheels 22a, 22b via a differential gear 24. The inverter 34 is connected to the motor 32, and is also connected to a high-voltage power line 42. The motor 32 is driven to rotate as the motor ECU 50 executes switching control over a plurality of switching elements (not shown) of the inverter 34. A smoothing capacitor 46 is connected to the positive electrode line and negative electrode line of the high-voltage power line 42.

The battery 36 is configured as, for example, a lithium ion secondary battery or a nickel-metal hydride secondary battery. The battery 36 is connected to a low-voltage power line 44. The low-voltage power line 44 serves as a second power line. A system main relay 38 and a smoothing capacitor 48 are connected to the positive electrode line and negative electrode line of the low-voltage power line 44 from the battery 36 side in this order. The system main relay 38 connects or disconnects the battery 36.

The first step-up converter 40 is connected to the high-voltage power line 42 and the low-voltage power line 44. The first step-up converter 40 is configured as a known step-up/step-down converter including two transistors, two diodes, and a reactor. The transistor that constitutes an upper arm is connected to the positive electrode line of the high-voltage power line 42. The transistor that constitutes a lower arm is connected to the upper arm transistor, the negative electrode line of the high-voltage power line 42, and the negative electrode line of the low-voltage power line 44. The reactor is connected to a connection point between the upper arm and lower arm transistors and the positive electrode line of the low-voltage power line 44. The motor ECU 50 adjusts the ratio of on duration of each of the upper arm and lower arm transistors. Thus, the first step-up converter 40 supplies electric power of the low-voltage power line 44 to the high-voltage power line 42, accompanied by an increase in voltage, or supplies electric power of the high-voltage power line 42 to the low-voltage power line 44, accompanied by a decrease in voltage.

The second step-up converter 41 is configured as a step-up converter having the same performance as the first step-up converter 40. That is, the second step-up converter 41, as well as the first step-up converter 40, is connected to the high-voltage power line 42 and the low-voltage power line 44. The second step-up converter 41 is configured as a known step-up/step-down converter including two transistors, two diodes, and a reactor. The motor ECU 50 adjusts the ratio of on duration of each of the upper arm and lower arm transistors. Thus, the second step-up converter 41 supplies electric power of the low-voltage power line 44 to the high-voltage power line 42, accompanied by an increase in voltage, or supplies electric power of the high-voltage power line 42 to the low-voltage power line 44, accompanied by a decrease in voltage.

Although not shown in the drawing, the motor ECU 50 is configured as a microprocessor mainly including a CPU. Other than the CPU, the motor ECU 50 includes a ROM, a RAM, a nonvolatile flash memory, and input/output ports. The ROM stores processing programs. The RAM temporarily stores data. Examples of signals that are input to the motor ECU 50 include a rotational position θm and phase currents Iu, Iv. The rotational position θm is transmitted from a rotational position detection sensor 32a. The rotational position detection sensor 32a detects a rotational position of the rotor of the motor 32. The phase currents Iu, Iv are transmitted from current sensors. The current sensors detect corresponding currents respectively passing through the phases of the motor 32. Examples of signals that are input to the motor ECU 50 also include a voltage VH of the high-voltage power line 42 (capacitor 46) and a voltage VL of the low-voltage power line 44 (capacitor 48). The voltage VH is transmitted from a voltage sensor 46a. The voltage sensor 46a is connected between the terminals of the capacitor 46. The voltage VL is transmitted from a voltage sensor 48a. The voltage sensor 48a is connected between the terminals of the capacitor 48. Furthermore, examples of signals that are input to the motor ECU 50 also include reactor currents IL1, IL2. The reactor current IL1 is transmitted from a current sensor 40a. The current sensor 40a detects a current that passes through the reactor of the first step-up converter 40. The reactor current IL2 is transmitted from a current sensor 41a. The current sensor 41a detects a current that passes through the reactor of the second step-up converter 41. Switching control signals, a first PWM driving signal, a second PWM driving signal, and the like, are output from the motor ECU 50. The switching control signals are transmitted to the plurality of switching elements of the inverter 34. The first PWM driving signal is transmitted to the two transistors of the first step-up converter 40. The second PWM driving signal is transmitted to the two transistors of the second step-up converter 41. The motor ECU 50 computes an electrical angle θe and rotation speed Nm of the motor 32 based on the rotational position θm of the rotor of the motor 32. The rotational position θm is transmitted from the rotational position detection sensor 32a.

Although not shown in the drawing, the main ECU 70 is configured as a microprocessor mainly including a CPU. Other than the CPU, the main ECU 70 includes a ROM, a RAM, a nonvolatile flash memory, and input/output ports. The ROM stores processing programs. The RAM temporarily stores data. As shown in FIG. 1, signals from various sensors are input to the main ECU 70 via the input port. Examples of the signals that are input to the main ECU 70 include an ignition signal and a shift position SRI The ignition signal is transmitted from an ignition switch 80. The shift position SP is transmitted from a shift position sensor 82. The shift position sensor 82 detects an operation position of a shift lever 81. Examples of the signals that are input to the main ECU 70 also include an accelerator operation amount Acc, a brake pedal position BP, and a vehicle speed V. The accelerator operation amount Acc is transmitted from an accelerator pedal position sensor 84. The accelerator pedal position sensor 84 detects a depression amount of an accelerator pedal 83. The brake pedal position BP is transmitted from a brake pedal position sensor 86. The brake pedal position sensor 86 detects a depression amount of a brake pedal 85. The vehicle speed V is transmitted from a vehicle speed sensor 88. Furthermore, examples of the signals that are input to the main ECU 70 also include a battery voltage Vb, a battery current Ib, and a battery temperature Tb. The battery voltage Vb is transmitted from a voltage sensor (not shown). The voltage sensor is connected between the terminals of the battery 36. The battery current Ib is transmitted from a current sensor (not shown). The current sensor is connected to the output terminal of the battery 36. The battery temperature Tb is transmitted from a temperature sensor (not shown). The temperature sensor is attached to the battery 36. As shown in FIG. 1, various control signals are output from the main ECU 70 via the output port. Examples of the signals that are output from main ECUl 70 include a driving control signal that is transmitted to the system main relay 38.

In the thus configured electric vehicle 20 of the embodiment, the main ECU 70 initially sets a required torque Td* that is required for traveling (that is required of the drive shaft 26) based on an accelerator operation amount Acc and a vehicle speed V, and sets a load power Pm that is required to be output from the motor 32 for traveling by multiplying the required torque Td* by a rotation speed of the drive shaft 26. Subsequently, the main ECU 70 sets a torque command Tm* such that the load power Pm is output from the motor 32, and sets a target voltage VH* of the high-voltage power line 42 based on the torque command Tm*. Then, the main ECU 70 sets a carrier frequency (carrier command) for generating driving signals to drive the first and second step-up converters 40, 41 based on the target voltage VH*. The set torque command Tm*, target voltage VH*, and carrier command are transmitted to the motor ECU 50. The motor ECU 50 executes switching control over the switching elements of the inverter 34 such that the motor 32 is driven at the torque command Tm*. The motor ECU 50 generates a first PWM driving signal and a second PWM driving signal based on the carrier command such that the high-voltage power line 42 has the target voltage VH*. The motor ECU 50 executes switching control over the two transistors of the first step-up converter 40 with the first PWM driving signal, and executes switching control over the two transistors of the second step-up converter 41 with the second PWM driving signal.

Figure 2:
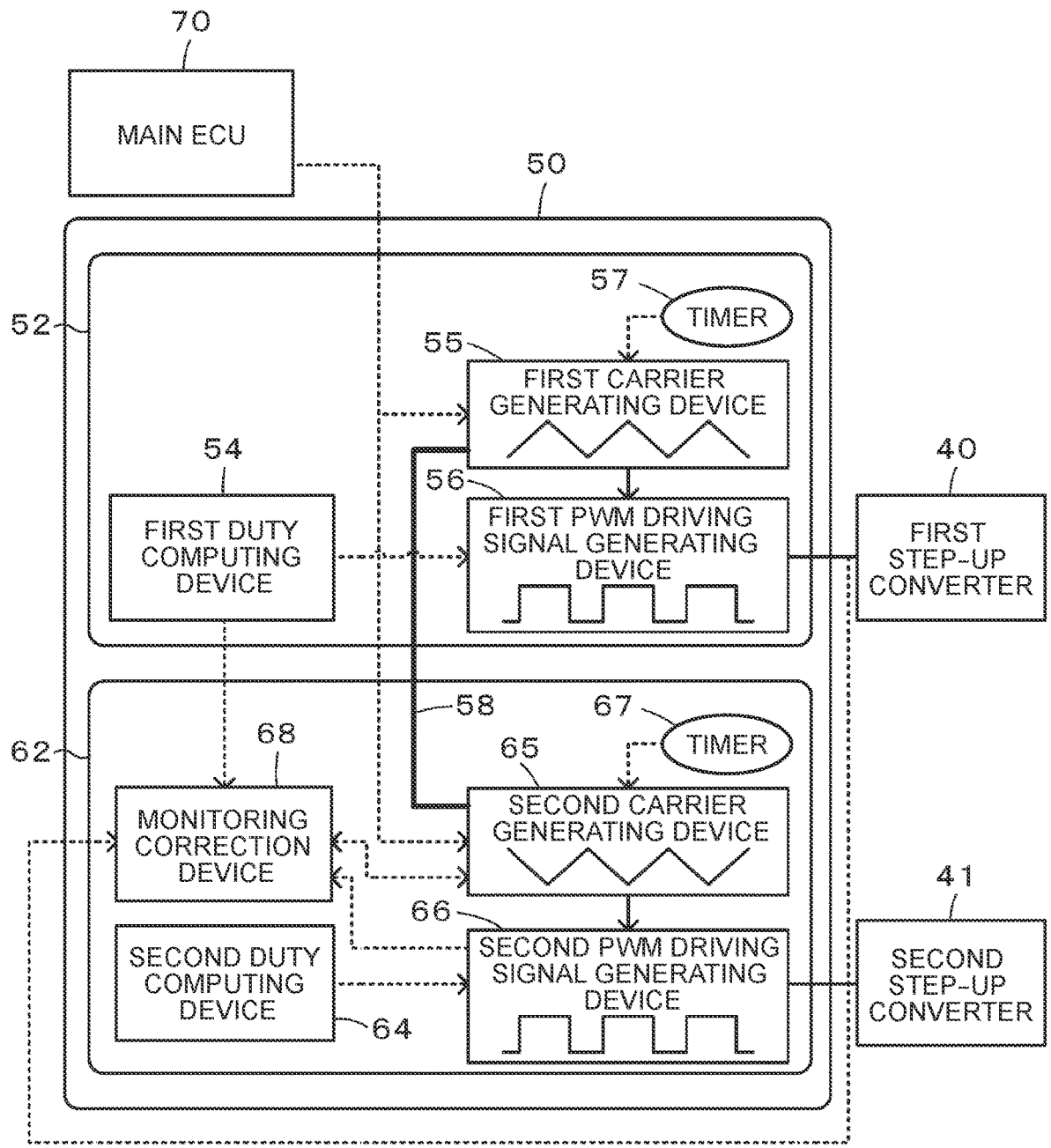
FIG. 2 is a block diagram that mainly shows an example of the configuration of functions of a motor ECU that serves as electronic control units of the converter control system.

FIG. 2 is a block diagram that mainly shows an example of the configuration of functions of the motor ECU 50 that serves as electronic control units of the converter control system. The motor ECU 50 not only functions as a unit that controls the drive of the motor 32 but also includes a first electronic control unit 52, a second electronic control unit 62, and a synchronization line 58. The first electronic control unit 52 is used to control the drive of the first step-up converter 40. The second electronic control unit 62 is used to control the drive of the second step-up converter 41. The synchronization line 58 connects the first electronic control unit 52 and the second electronic control unit 62 to each other. Hereinafter, the first electronic control unit 52 is referred to as first ECU, and the second electronic control unit 62 is referred to as second ECU.

The first ECU 52 includes a first duty computing device 54, a first carrier generating device 55, a first PWM driving signal generating device 56, and a timer 57. The first duty computing device 54 computes a duty ratio (first duty ratio) for the first PWM driving signal through feedback control based on the voltage VH of the high-voltage power line 42, the reactor current L1 of the first step-up converter 40, the target voltage VH*, and the like. The first carrier generating device 55 generates a first carrier for generating a first PWM driving signal based on a signal from the timer 57, and a carrier command. The first PWM driving signal generating device 56 generates a first PWM driving signal by applying the first duty ratio from the first duty computing device 54 to the first carrier from the first carrier generating device 55, and outputs the generated first PWM driving signal to the first step-up converter 40.

The second ECU 62 includes a second duty computing device 64, a second carrier generating device 65, a second PWM driving signal generating device 66, a timer 67, and a monitoring correction device 68. The second duty computing device 64 computes a duty ratio (second duty ratio) for the second PWM driving signal through feedback control based on the voltage VH of the high-voltage power line 42, the reactor current L2 of the second step-up converter 41, the target voltage VH*, and the like. The second carrier generating device 65 generates a second carrier for generating a second PWM driving signal based on a signal from the timer 67, and a carrier command. The second carrier is generated as a carrier having the same frequency as the first carrier with a phase shifted by $\pi$. The second carrier generating device 65 is connected to first carrier generating device 55 by the synchronization line 58, and adjusts the second carrier such that the second carrier is synchronized with the first carrier asynchronous in phase with the second carrier. The second PWM driving signal generating device 66 generates a second PWM driving signal by applying the second duty ratio from the second duty computing device 64 to the second carrier from the second carrier generating device 65, and outputs the generated second PWM driving signal to the second step-up converter 41.

The monitoring correction device 68 determines whether the synchronization line 58 has a break. When the synchronization line 58 has a break, the monitoring correction device 68 determines whether there is a deviation in synchronization between the first carrier and the second carrier. When there is a deviation in synchronization between the first carrier and the second carrier, the monitoring correction device 68 shuts down the second step-up converter 41, and restarts the second carrier generating device 65 such that the second carrier generating device 65 generates a second carrier synchronous with the first carrier with a phase shifted by $\pi$ based on a carrier command and a first PWM driving signal. Hereinafter, the operation of the monitoring correction device 68 will be described in detail.

Figure 3:
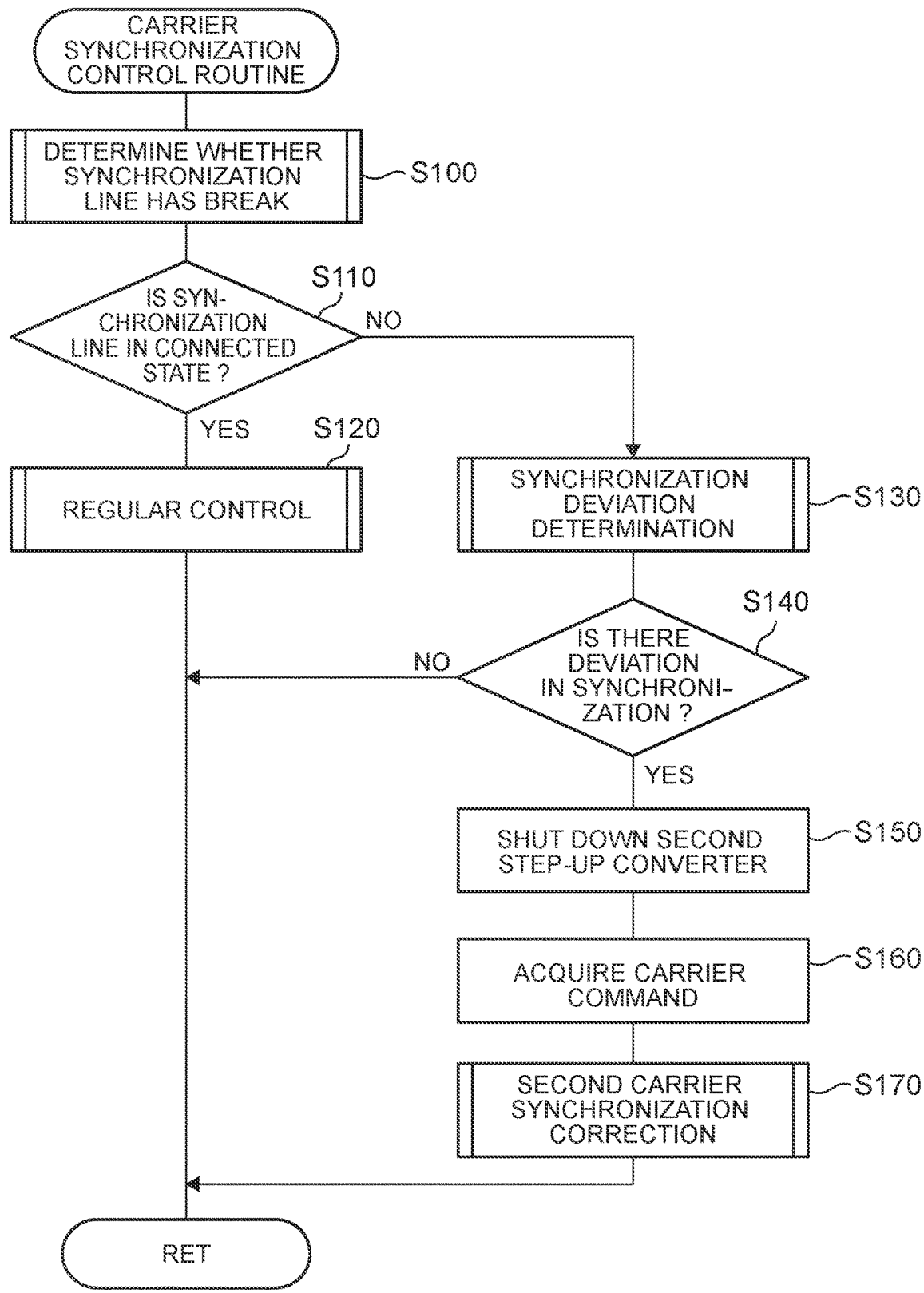
FIG. 3 is a flowchart that shows an example of a carrier synchronization control routine that is executed by a monitoring correction device.

FIG. 3 is a flowchart that shows an example of a carrier synchronization control routine that is executed by the monitoring correction device 68. This routine is repeatedly executed at predetermined time intervals.

As the carrier synchronization control routine is executed, the monitoring correction device 68 initially determines whether the synchronization line 58 has a break (step S100), and determines whether the synchronization line 58 is in a connected state (step S110). A determination as to whether the synchronization line 58 has a break is carried out based on whether there is a synchronization signal from the first duty computing device 54. That is, when the synchronization signal has been received from the first duty computing device 54, the monitoring correction device 68 determines that the synchronization line 58 has no break (the synchronization line 58 is in a connected state). When no synchronization signal has been received from the first duty computing device 54, the monitoring correction device 68 determines that the synchronization line 58 has a break (the synchronization line 58 is not in a connected state). When the monitoring correction device 68 determines that the synchronization line 58 is in a connected state (the synchronization line 58 has no break), synchronization of the second carrier with the first carrier by the synchronization line 58 is carried out under regular control (step S120), after which the monitoring correction device 68 ends the routine. Examples of the regular control for synchronization include the following control for synchronizing the second carrier with the first carrier. The first carrier generating device 55 outputs a synchronization signal through the synchronization line 58 at the timing of a peak (top) or valley (bottom) of the first carrier, and the second carrier generating device 65 generates a second carrier such that the second carrier is shifted in phase from the first carrier by $\pi$ at the timing of receipt of the synchronization signal, that is, the second carrier takes a peak (top) at the time when the first carrier takes a valley (bottom) and the second carrier takes a valley (bottom) at the time when the first carrier takes a peak (top).

Figure 4:
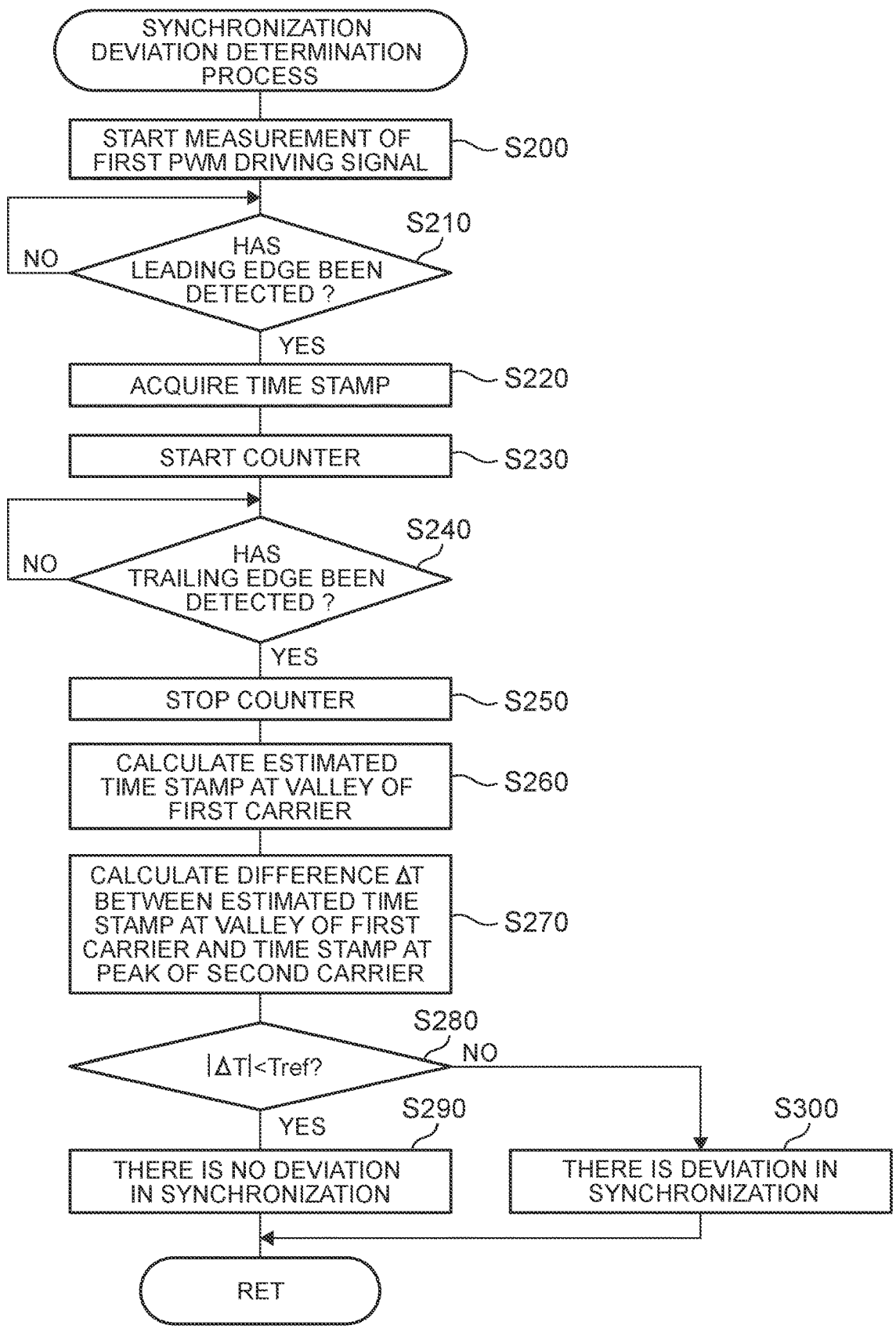
FIG. 4 is a flowchart that shows an example of a synchronization deviation determination process.

When the monitoring correction device 68 determines in step S110 that the synchronization line 58 is not in a connected state (the synchronization line 58 has a break), the monitoring correction device 68 determines whether there is a deviation in synchronization between the first carrier and the second carrier (step S130, step S140). When the monitoring correction device 68 determines that there is no deviation in synchronization, since the monitoring correction device 68 does not need to correct synchronization, the monitoring correction device 68 ends the routine. A determination as to whether there is a deviation in synchronization between the first carrier and the second carrier (synchronization deviation determination) is carried out by a synchronization deviation determination process that is illustrated in FIG. 4. The description of control that is executed by the carrier synchronization control routine shown in FIG. 3 is interrupted, and, hereinafter, the synchronization deviation determination process will be described with reference to FIG. 4.

Figure 5:
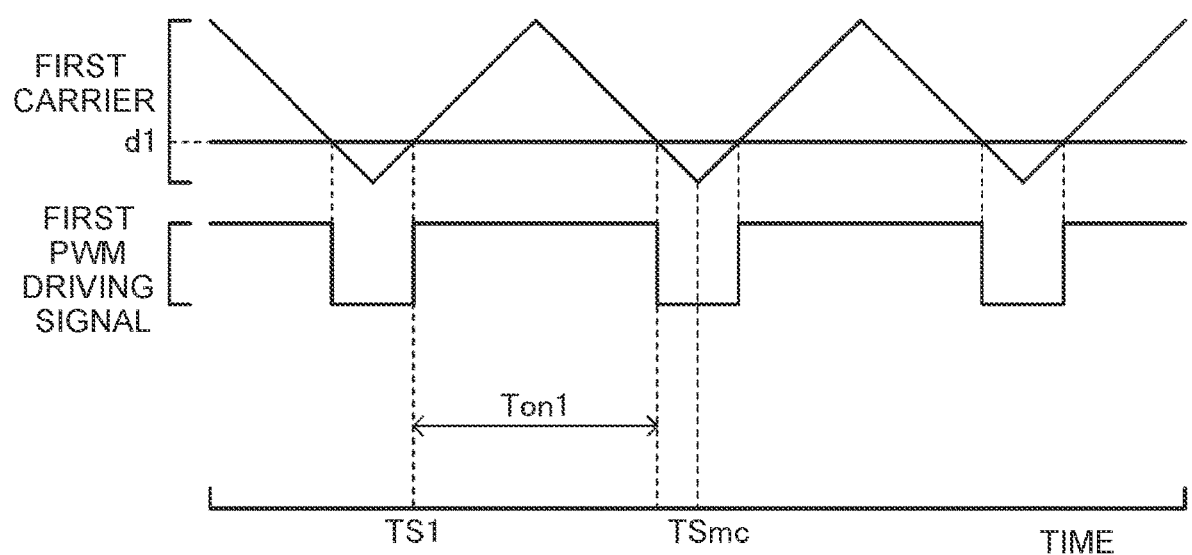
FIG. 5 is a view that illustrates a state of estimating a time stamp at a valley (bottom) of a first carrier.

In the synchronization deviation determination process, initially, the first PWM driving signal that is being output from the first PWM driving signal generating device 56 to the first step-up converter 40 is input, and measurement of the first PWM driving signal is started (step S200), and then detection of a leading edge of the first PWM driving signal is waited (step S210). As a leading edge of the first PWM driving signal has been detected, a time stamp TS1 of the leading edge of the first PWM driving signal is acquired (step S220), and a counter T for measuring a duration is started (step S230). Subsequently, detection of a trailing edge of the first PWM driving signal is waited (step S240). As a trailing edge of the first PWM driving signal has been detected, the counter T is stopped (step S250). An estimated time stamp TSmc at a valley (bottom) of the first carrier is estimated based on the time stamp TS1 of the leading edge of the first PWM driving signal, a duration Ton1 from the leading edge to the trailing edge, obtained from the value of the counter T, and the first duty ratio from the first duty computing device 54 (step S260). FIG. 5 shows a state of estimating an estimated time stamp TSmc at a valley (bottom) of the first carrier. In FIG. 5, d1 of the first carrier is the first duty ratio. An estimated time stamp TSmc at a valley (bottom) of the first carrier is expressed by the following mathematical expression (1).

$$Tw = \frac{100 - d1}{2d1} Ton2 \ TSmc = TS1 + \frac{100 + d1}{2d1} Ton1 \qquad (1)$$

As an estimated time stamp TSmc at a valley (bottom) of the first carrier has been calculated in this way, a time difference ΔT between the estimated time stamp TSmc and a time stamp TSsc at a peak (top) of the second carrier is calculated (step S270). It is determined whether the absolute value of the time difference ΔT is shorter than a measurement error Tref (step S280). When it is determined that the absolute value of the time difference ΔT is shorter than the measurement error Tref, it is determined that there is no deviation in synchronization between the first carrier and the second carrier (step S290), and the synchronization deviation determination process is ended. When it is determined that the absolute value of the time difference ΔT is longer than or equal to the measurement error Tref, it is determined that there is a deviation in synchronization between the first carrier and the second carrier (step S300), and the synchronization deviation determination process is ended. The measurement error Tref is, for example, a delay time that is required to receive a first PWM driving signal.

Referring back to the carrier synchronization control routine of FIG. 3, when the monitoring correction device 68 determines through the synchronization deviation determination of step S130 and step S140 that there is a deviation in synchronization between the first carrier and the second carrier, the monitoring correction device 68 shuts down the second step-up converter 41 (step S150), acquires a carrier command from the second carrier generating device 65 (step S160), and corrects synchronization of the second carrier (step S170), after which the monitoring correction device 68 ends the routine. A shutdown of the second step-up converter 41 is carried out by stopping the output operations of the second carrier generating device 65 and second PWM driving signal generating device 66. Correction of synchronization of the second carrier is carried out by a second carrier synchronization correction process that is illustrated in FIG. 6.

Figure 6:
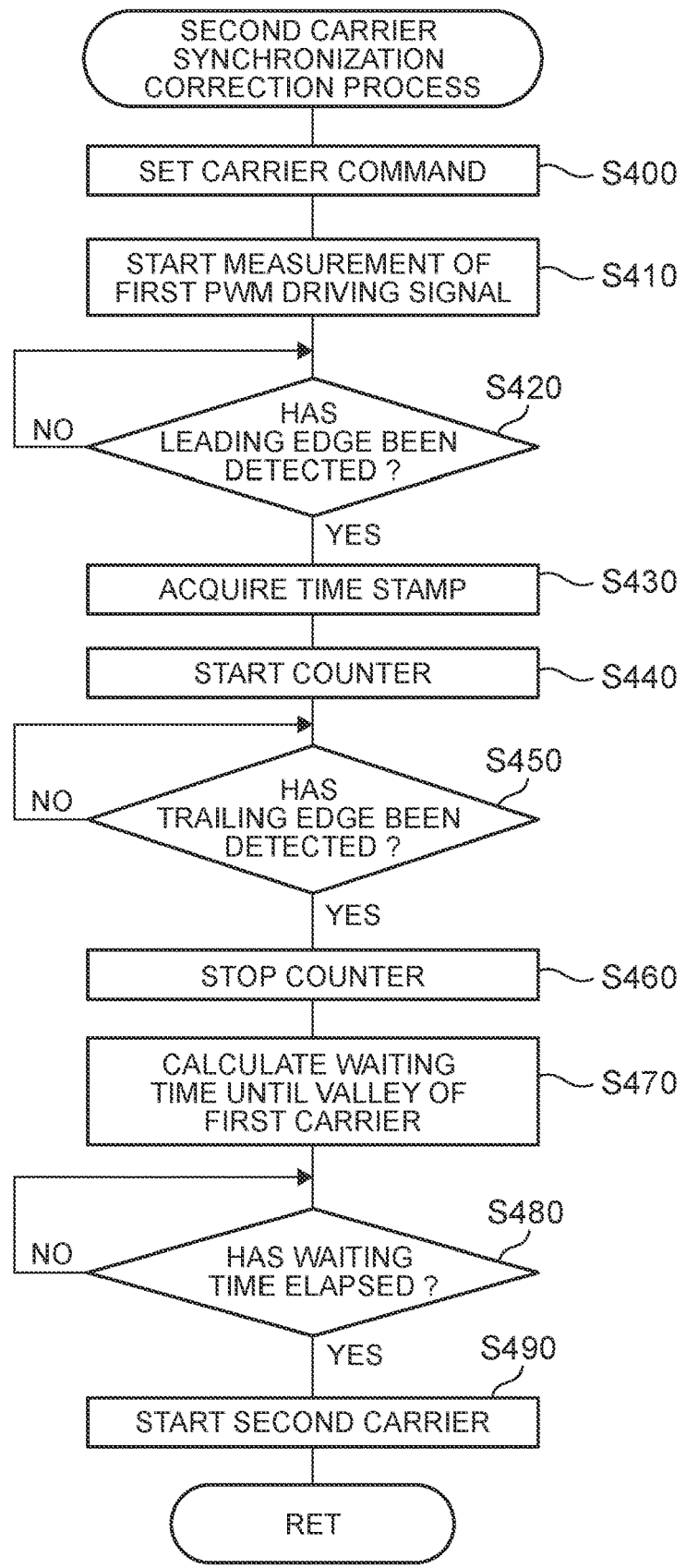
FIG. 6 is a flowchart that shows an example of a second carrier synchronization correction process.

In the second carrier synchronization correction process of FIG. 6, initially, the acquired carrier command is set in a register (step S400), the first PWM driving signal that is being output from the first PWM driving signal generating device 56 to the first step-up converter 40 is input, and then measurement of the first PWM driving signal is started (step S410). Subsequently, detection of a leading edge of the first PWM driving signal is waited (step S420). As a leading edge of the first PWM driving signal has been detected, a time stamp TS2 of the leading edge of the first PWM driving signal is acquired (step S430), and a counter T for measuring a duration is started (step S440). Subsequently, detection of a trailing edge of the first PWM driving signal is waited (step S450). As a trailing edge of the first PWM driving signal has been detected, the counter T is stopped (step S460). A waiting time Tw from the trailing edge of the first PWM driving signal to a valley (bottom) of the first carrier is calculated based on the time stamp TS2 of the leading edge of the first PWM driving signal, a duration Ton2 from the leading edge to the trailing edge, obtained from the value of the counter T, and the first duty ratio d1 from the first duty computing device 54 (step S470). The waiting time Tw is calculated from the following mathematical expression (2). After a lapse of the waiting time Tw (step S480), generation of a second carrier by the second carrier generating device 65 is started (step S490), and then the second carrier synchronization correction process is ended. At the beginning of generation of a second carrier, in consideration of a delay required to calculate timing, a second carrier is generated at the timing advanced from a peak (top) of the second carrier by the delay. The delay includes a delay time that is required to receive the first PWM driving signal and a time that is required to compute the waiting time Tw.

$$Tw = \frac{100 - d1}{2d1} Ton2 \qquad (2)$$

Figure 7:
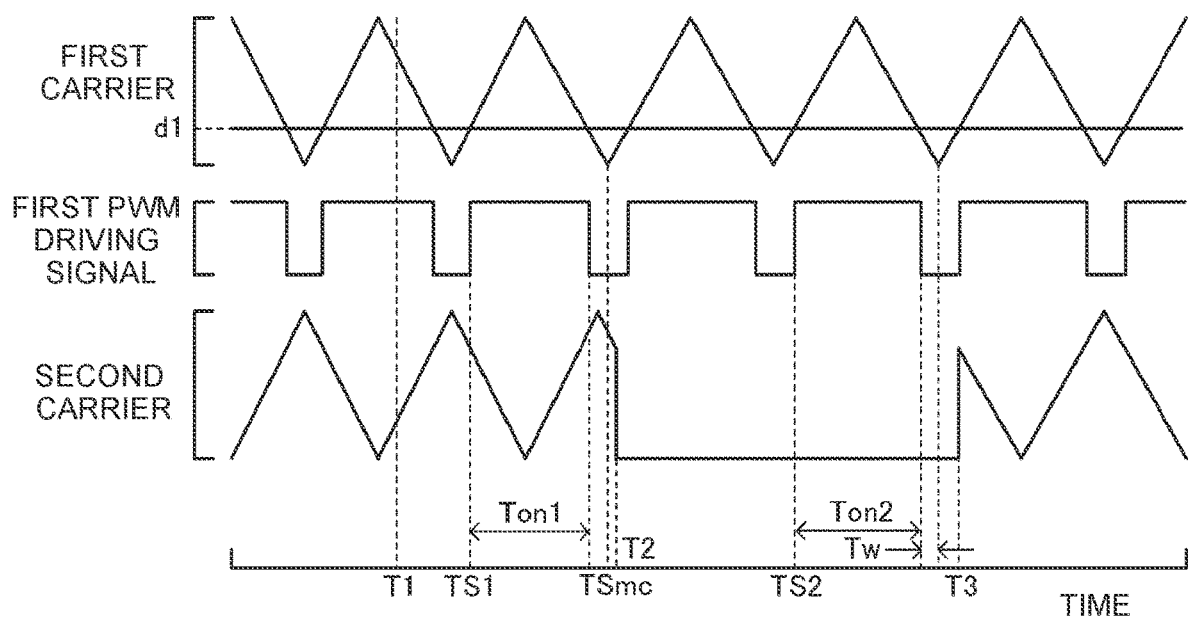
FIG. 7 is a view that illustrates a state of correcting a deviation in synchronization between the first carrier and a second carrier.

FIG. 7 is a view that illustrates a state of correcting a deviation in synchronization between the first carrier and the second carrier. It is determined at time T1 that the synchronization line 58 has a break, and the synchronization deviation determination process is executed. As it is determined at time T2 that there is a deviation in synchronization between the first carrier and the second carrier, the second step-up converter 41 is shut down, and the second carrier synchronization correction process is executed. Generation of a second carrier is restarted at time T3, and synchronization between the first carrier and the second carrier is ensured.

In the converter control system mounted on the electric vehicle 20 of the above-described embodiment, it is determined whether the synchronization line 58 has a break, when it is determined that the synchronization line 58 has a break, an estimated time stamp TSmc at a valley (bottom) of the first carrier is estimated based on the first PWM driving signal and the first duty ratio, and it is determined that there is a deviation in synchronization when a time difference ΔT between the estimated time stamp TSmc and a time stamp TSsc at a peak (top) of the second carrier is longer than or equal to a measurement error Tref. As it is determined that there is a deviation in synchronization, the second step-up converter 41 is shut down, a waiting time Tw until a valley (bottom) of the first carrier is calculated based on the first PWM driving signal and the first duty ratio, and generation of a second carrier is restarted after a lapse of the waiting time Tw. At this time, in consideration of a delay, generation of a second carrier is started such that a peak (top) of the second carrier comes at the timing of a valley (bottom) of the first carrier, that is, the phase is shifted by it. Thus, when the first carrier and the second carrier are not synchronous with each other, it is possible to synchronize the second carrier with the first carrier. As a result, it is possible to reduce inconvenience (such as hardware failure) that occurs due to the fact that the first carrier and the second carrier are not synchronous with each other.

In the converter control system mounted on the electric vehicle 20 of the embodiment, in the synchronization deviation determination process, an estimated time stamp TSmc at a valley (bottom) of the first carrier is estimated based on a time stamp TS1 of a leading edge of the first PWM driving signal, a duration Ton1 from the leading edge to a trailing edge, obtained from the value of the counter T, and the first duty ratio from the first duty computing device 54. Alternatively, an estimated time stamp at a peak (top) of the first carrier may be estimated based on a time stamp of a trailing edge of the first PWM driving signal, a duration from the trailing edge to a leading edge, obtained from the value of the counter T, and the first duty ratio. In this case, it just needs to be determined whether there is a deviation in synchronization by comparing the measurement error Tref with a time difference between the estimated time stamp at a peak (top) of the first carrier and a time stamp at a valley (bottom) of the second carrier.

In the converter control system mounted on the electric vehicle 20 of the embodiment, in the second carrier synchronization correction process, a waiting time Tw until a valley (bottom) of the first carrier is calculated based on a time stamp TS2 of a leading edge of the first PWM driving signal, a duration Ton2 from the leading edge until a trailing edge, obtained from the value of the counter T, and the first duty ratio d1 from the first duty computing device 54. Alternatively, a waiting time until a peak (top) of the first carrier may be calculated based on a time stamp of a trailing edge of the first PWM driving signal, a duration from the trailing edge to a leading edge, obtained from the value of the counter T, and the first duty ratio d1. In this case, generation of a second carrier by the second carrier generating device 65 just needs to be started such that the second carrier takes a valley (bottom) at the time when a waiting time until a peak (top) of the first carrier has elapsed.

In the converter control system mounted on the electric vehicle 20 of the embodiment, it is determined whether the synchronization line 58 has a break, the synchronization deviation determination process is executed when the synchronization line 58 has a break, and the second carrier synchronization correction process is executed when it is determined that there is a deviation in synchronization. Alternatively, without determining whether the synchronization line 58 has a break, the synchronization deviation determination process may be constantly executed, and the second carrier synchronization correction process may be executed when it is determined that there is a deviation in synchronization.

In the converter control system mounted on the electric vehicle 20 of the embodiment, the first step-up converter 40 and the second step-up converter 41 are connected to the same battery 36. Instead, the first step-up converter 40 and the second step-up converter 41 may be connected to different batteries, respectively.

In the converter control system mounted on the electric vehicle 20 of the embodiment, the first step-up converter 40 and the second step-up converter 41 are connected to the single battery 36 that serves as an electrical storage device. Instead, the first step-up converter 40 and the second step-up converter 41 may be connected to a capacitor that serves as an electrical storage device.

In the embodiment and alternative embodiments, the converter control system is mounted on the electric vehicle 20 or a hybrid vehicle. Alternatively, the converter control system may be mounted on a mobile unit other than automobiles, and the converter control system may be installed into stationary equipment, such as construction equipment.

In the embodiment, the first step-up converter 40 is an example of a first step-up converter, the second step-up converter 41 is an example of a second step-up converter, the first ECU 52 is an example of a first electronic control unit, and the second ECU 62 is an example of a second electronic control unit. The monitoring correction device 68 is an example of a monitoring correction device.

The embodiment of the disclosure is described above; however, the disclosure is not limited to the embodiment. Of course, the disclosure may be implemented in various forms without departing from the scope of the disclosure.

The disclosure is usable in, for example, a manufacturing industry for a converter control system.

What is claimed is:
1. A converter control system comprising:
 a first step-up converter configured to be driven in accordance with a first PWM driving signal;
 a second step-up converter configured to be driven in accordance with a second PWM driving signal;
 a first electronic control unit configured to generate the first PWM driving signal based on a first duty ratio and a first carrier based on a carrier command; and
 a second electronic control unit configured to generate the second PWM driving signal based on a second duty ratio and a second carrier based on the carrier command, the second carrier being asynchronous in phase with the first carrier, the second electronic control unit including a monitoring correction device, the monitoring correction device being configured to execute a synchronization monitoring process, the synchronization monitoring process being a process of determining whether the first carrier and the second carrier are synchronous with each other based on the first PWM driving signal, the first duty ratio, and the second carrier, the monitoring correction device being configured to, when it is determined that the first carrier and the second carrier are not synchronous with each other, execute a shutdown process and a first restart process, the shutdown process being a process of shutting down the second step-up converter, the first restart process being a process of restarting generation of the second PWM driving signal with the second carrier synchronous with the first carrier with the use of the first PWM driving signal and the first duty ratio.
2. The converter control system according to claim 1, further comprising a synchronization line, wherein the first electronic control unit includes
 a first carrier generating device configured to generate the first carrier based on the carrier command, a first duty computing device configured to compute the first duty ratio, and a first PWM driving signal generating device configured to generate the first PWM driving signal based on the first carrier and the first duty ratio, the second electronic control unit includes a second carrier generating device configured to generate the second carrier based on the carrier command, a second duty computing device configured to compute the second duty ratio, and a second PWM driving signal generating device configured to generate the second PWM driving signal based on the second carrier and the second duty ratio, the synchronization line connects the first carrier generating device and the second carrier generating device to each other, the synchronization line is configured to exchange a synchronization signal for synchronizing the second carrier with the first carrier, and the monitoring correction device is configured to determine whether there is an abnormality in synchronization through the synchronization line, the monitoring correction device is configured to, when the monitoring correction device determines that there is an abnormality in synchronization through the synchronization line, execute the synchronization monitoring process, the shutdown process, and the first restart process.

3. The converter control system according to claim 2, wherein the monitoring correction device has a calculation process and a determination process as the synchronization monitoring process, the calculation process is a process of calculating first timing of the first carrier based on time of a leading edge of the first PWM driving signal, a duration from the leading edge to a trailing edge of the first PWM driving signal, and the first duty ratio, and the determination process is a process of, when a difference between the first timing and second timing of the second carrier is shorter than a threshold, determining that the first carrier and the second carrier are synchronous with each other.

4. The converter control system according to claim 3, wherein the first timing is one of timing at a valley of the first carrier and timing at a peak of the first carrier, and the second timing is timing at a peak of the second carrier when the first timing is the timing at a valley of the first carrier, and is timing at a valley of the second carrier when the first timing is the timing at a peak of the first carrier.

5. The converter control system according to claim 2, wherein the monitoring correction device has a first estimation process and a second restart process as the first restart process, the first estimation process is a process of estimating third timing of the first carrier based on the first PWM driving signal and the first duty ratio, and the second restart process is a process of restarting the second carrier generating device such that the third timing of the first carrier coincides with fourth timing of the second carrier at a frequency based on the carrier command.

6. The converter control system according to claim 5, wherein the monitoring correction device has a second estimation process and a third restart process as the first restart process, the second estimation process includes the following processes i) and ii), i) estimating the third timing of the first carrier based on time of a leading edge of the first PWM driving signal, a duration from the leading edge to a trailing edge of the first PWM driving signal, and the first duty ratio, and ii) estimating a waiting time until the third timing, and the third restart process is a process of restarting the second carrier generating device such that the fourth timing of the second carrier comes at the time when the waiting time until the third timing has elapsed.

7. The converter control system according to claim 5, wherein the third timing is one of timing at a valley of the first carrier and timing at a peak of the first carrier, and the fourth timing is timing at a peak of the second carrier when the third timing is timing at a valley of the first carrier, and is timing at a valley of the second carrier when the third timing is timing at a peak of the first carrier.

* * * * *

UNITED STATES PATENT AND TRADEMARK OFFICE
CERTIFICATE OF CORRECTION

PATENT NO. : 10,797,588 B2
APPLICATION NO. : 16/142827
DATED : October 6, 2020
INVENTOR(S) : Toshihiro Yasuda Page 1 of 1

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

In the Specification

In Column 3, Line(s) 50, after "phase by", delete "n" and insert --$\pi$--, therefor.

In Column 6, Line(s) 27, delete "SRI" and insert --SP--, therefor.

In Column 11, Line(s) 11, after "shifted by", delete "it" and insert --$\pi$--, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*